Sept. 29, 1953  C. F. VOYTECH  2,653,837
HIGH-PRESSURE ROTARY SEAL WITH O RING
Filed May 27, 1948

INVENTOR.
Charles F. Voytech
BY

Patented Sept. 29, 1953

2,653,837

UNITED STATES PATENT OFFICE 2,653,837

HIGH-PRESSURE ROTARY SEAL WITH O RING

Charles F. Voytech, Chicago, Ill., assignor to Crane Packing Company, Chicago, Ill., a corporation of Illinois Application May 27, 1948, Serial No. 29,559

3 Claims. (Cl. 286—11.14)

1

This invention relates to rotary mechanical seals which utilize two relatively rotatable radially disposed surfaces to effect a seal.

In my co-pending application, Serial No. 715,973, filed December 13, 1946, now abandoned, there is disclosed a mechanical seal comprising a self-contained unit which is frictionally retained in a recess in one of the members. The seal includes a sealing washer, an endless ring of circular radial cross-section compressed between the washer and recess and forming a fluid-tight seal therebetween, a spring for holding the washer against the other element, and a retainer for holding the washer and spring in assembled relation. The ring is held on the washer by a metal washer interposed between the spring and sealing washer. With this construction, fluid pressure acting upon the washer and ring is transmitted to the metal washer and thence to the spring. If the spring pressure is less than the fluid pressure, the seal will open, and hence the said seal is limited in its application to low pressure installations when the fluid pressure acts in opposition to the spring.

The principal object of this invention is to provide a seal of the type described in my co-pending application in which the fluid pressure acting upon the ring is not transmitted to the spring so that the seal can withstand pressures greater than the spring pressure.

A more specific object of this invention is to provide a seal of the type described in my co-pending application in which a light stamping is provided adjacent the ring, said stamping abutting on a section of the retainer for the spring so that fluid pressure acting upon the ring will be taken by the stamping and transmitted by the stamping to the retainer.

A still more specific object of this invention is to provide a seal of the type referred to having a spring retainer for accommodating a spring of greater outside diameter than the outside diameter of the washer over which the packing ring is fitted, the spring being compressed between the retainer and the washer and a rigid ring is provided adjacent the packing ring encircling the washer, the rigid ring being provided with an axially extending flange which abuts on the spring retainer and thereby limits movement of the packing ring while permitting freedom of movement to the washer and spring.

These and other objects and features of this invention will become apparent from the following detailed description when taken together with the accompanying drawings, in which

2

Fig. 1 is an elevation in section taken through a seal made in accordance with this invention, the seal being installed around a shaft and held by the end cap of a pump or the like;

Figure 1:
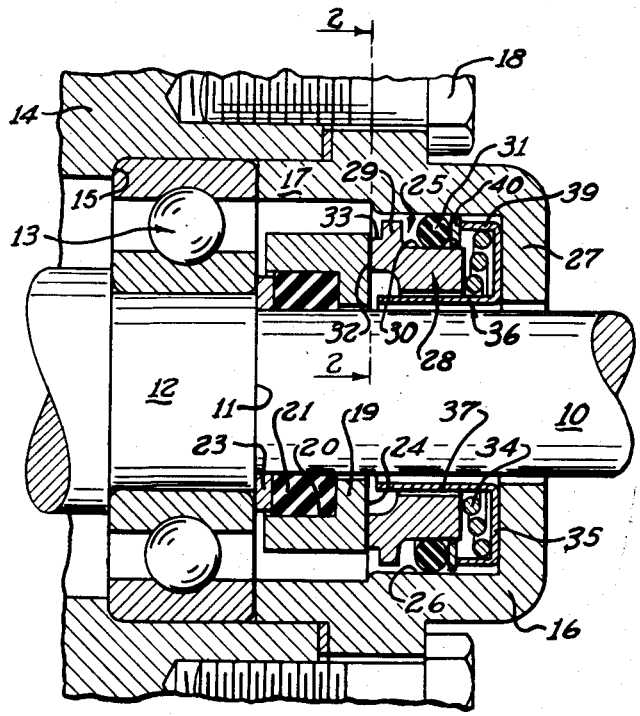

Referring now to the drawings for a detailed description of the invention, there is shown at 10 a shaft having a shoulder 11 formed by a shaft section 12 of increased diameter upon which is mounted an anti-friction bearing 13. Said bearing 13 is in turn mounted in housing 14 and is held against axial movement relative to the housing by a shoulder 15 and an end cap 16, the latter being provided with a centering flange 17 which abuts on the bearing and holds it against shoulder 15. Suitable fastening means such as bolts 18 or the like are used to hold end cap 16 on housing 14.

One of the elements of the mechanical seal is comprised of a seat ring 19 made of rigid material such as cast iron, steel or the like, said seat having a recess 20 formed therein in which is compressed a ring 21 of resilient deformable material such as rubber, either synthetic or natural or a combination of the two. A washer 23 of a slightly smaller outside diameter than the diameter of recess 20 is pressed against shoulder 11 and forms a rigid wall against which ring 21 is compressed in an axial direction. A radially disposed surface 24 is formed on seat 19, said surface 24 being suitably ground and lapped so as to be perfectly flat and smooth.

It is contemplated that the compression of ring 21 will be sufficiently great to cause seat 19 to be rotated with shaft 10 due to the frictional forces developed between seat 19, ring 21 and shaft 10.

End cap 16 is formed with a recess 25 having a cylindrical wall 26 and an axially extending sleeve portion merging with a substantially radially disposed wall 27. Located in recess 26 is a sealing washer 28 made of a material which has long-wearing qualities when run against the material of seat 19, such material for example being carbon or a composition of a synthetic resin such a phenol-formaldehyde in which are dispersed metallic particles of an alloy containing lead, tin and antimony. Said washer 28 has a radially upwardly extending flange 29 formed near one end and a substantially cylindrical surface 30 comprising the remainder of its outer periphery. Between surface 30 and surface 26 in recess 25 is compressed an endless ring 31 of resilient compressible material such as rubber, either natural or synthetic or a combination of the two. Said ring 31 is molded so as to have a substantially circular radial cross-section to form a fluid-tight seal between washer 28 and end cap 16 while rolling to accommodate relative axial movement between the washer and cap. Such rings are commonly known to the trade as O rings.

Washer 28 is also provided with a radially disposed surface 32 which is suitably ground and lapped so as to be perfectly flat and smooth to form a fluid-tight running joint with surface 24 on seat 19. Surface 32 is formed on the end of an axially extending flange 33 formed on the washer 28, said flange 33 having an outside diameter which is slightly greater than the outside diameter of surface 30. With such relationship between the diameters of flange 33 and surface 30, fluid pressure exerted upon the exterior of washer 28 to the left of ring 31 as viewed in Fig. 1 will have a net axial force acting upon the washer in a direction to hold the washer against seat 19. Obviously, the diameter of flange 33 can be altered to increase or decrease this pressure or to effect a perfect fluid pressure balance.

Washer 28 is normally held against seat 19 by a spring 34 which is shown as a conical spring so as to minimize the axial space required thereby. Other well-known types of spring may also be used. The spring is compressed between the right-hand end (Fig. 1) of washer 28 and a radially extending wall 35 on a retainer 36. Said retainer 36 can most readily be made as a stamping and its function is to hold the spring and washer 28 in assembled relation so that the washer, spring and sealing ring 31 may be handled as a complete unit. To this end retainer 36 is provided with an axially extending cylindrical portion 37 which is telescoped into washer 28 and is provided at the outer extremity thereof with lugs 38 (Fig. 2). Lugs 38 are bent over into the path of movement of washer 28 after spring 34 and washer 28 have been assembled with respect to retainer 36.

At the outer extremity of radial portion 35 on retainer 36 is a short axially extending flange 39, the end of which is in proximity to ring 31. Intermediate ring 31 and the end of flange 39 is a rigid washer or thrust member 40 having an internal diameter slightly larger than the external diameter of surface 30 and an outside diameter which is slightly less than the diameter of surface 26 in recess 25 so that washer 40 is free to move axially in the space between washer 28 and the wall 26 of the recess 25. Thus, washer 40 is normally centered with respect to the seal by surface 30 before the seal is assembled with respect to end cap 16 and when the seal is installed, the washer does not interfere in any way with the movement of sealing washer 28. The outside diameter of washer 40 however is at least as great as the outside diameter of flange 39 so that the two will overlap and flange 39 will act as an abutment for washer 40 in the event that the said washer 40 is urged against the flange by ring 31 under the influence of high fluid pressures.

Figure 2:
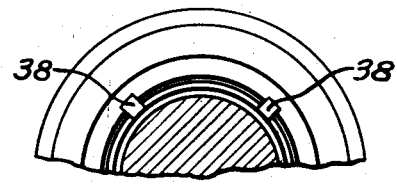
Fig. 2 is a partial elevation taken along the line 2—2 of Fig. 1 showing the means for holding the seal in assembled relation.

It will be apparent from the foregoing that if the seal is installed as shown in Fig. 1, any fluid pressure existing in recess 25 will be transmitted to ring 31 which in turn will be moved to the right as viewed in Fig. 1 against washer 40. Washer 40 in turn will move back until it strikes the end of flange 30 whereupon it will be held against further movement regardless of the fluid pressure acting upon ring 31, within, of course, the physical limits of the material of the washer and flange. The fluid pressure will not be transmitted to spring 34 except incidentally through the friction between ring 31 and surface 30 of washer 28. It is contemplated that this friction will be a minimum, or at least that the pressure of spring 34 will always be sufficiently great to move washer 28 towards seat 19 against the frictional resistance imposed by ring 31. Thus, the seal shown in Fig. 1 will be satisfactory for relatively high pressures, the pressures being higher than those sufficient to compress spring 34, and furthermore, the action of the pressure on the washer 28 can be made to assist spring 34 to any desired degree merely by changing the outside diameter of flange 33.

Referring now to the modification shown in Fig. 3, there is again shown the shaft 10, seat 19, compressible ring 21, and sealing surface 24, all of which may be identical with the rotatable like-numbered portions of the seal shown in Fig. 1. Similarly, the end cap 16, recess 25, washer 28, surface 30, ring 31 and surface 26 are all identical with the similarly numbered portions of the seal shown in Fig. 1. The retainer, however, is modified so as to terminate in a radially extending flange 41, the outside diameter of which may be equal to or slightly greater than the outside diameter of flange 39 of Fig. 1. Spring 34 is again compressed between wall 41 and washer 28 and similarly exerts an axial pressure upon washer 28 in the direction of seat 19.

Fluid pressure acting upon ring 31 is taken by a flanged rigid ring 42, said ring having a radially disposed portion 43 adjacent ring 31 and substantially radially coextensive therewith and an axially extending flange 44 which abuts on wall 41 so that any axial pressure exerted upon the ring 42 by sealing ring 31 is transmitted through flange 44 to portion 41 on the retainer.

Figure 3:
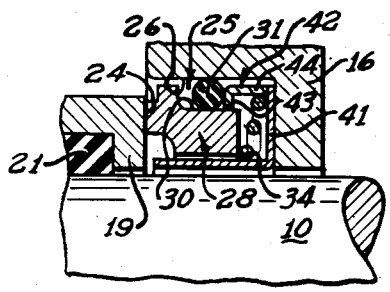
Fig. 3 is a modification of the seal of Fig. 1.

The seal shown in Fig. 3 will function to relieve spring 34 of pressure in identically the same manner as the seal shown in Fig. 1. However, the retainer of the Fig. 3 form may be less expensive to make than the one shown in Fig. 1 inasmuch as the flange 39 is omitted.

In both forms it will be noted that the spring 34 may be of greater outside diameter than the internal diameter of ring 31, and that due to the fact that the washer 40 in the Fig. 1 form and the ring 42 in the Fig. 3 form are separate pieces which are assembled after the spring is mounted on the retainer, a chamber is created by the retainer and washer 40 or 42 for spring 34 which is of maximum radial dimension. This permits the use of a large spring and hence makes possible the provision of adequate pressure to maintain washer 28 in sealing engagement with seat 19.

If desired, the washer 28 may be held against rotation relative to retainer 36 by any well-known axially slidable connection, preferably the type shown in my aforesaid co-pending application, Serial No. 715,973.

It is understood that the foregoing description is illustrative of preferred embodiments of this invention and that the scope of the invention is not to be limited thereto, but is to be determined by the appended claims.

What is claimed is:

1. In a sealing device for establishing a fluid tight seal between relatively rotatable inner and outer parts having an annular space therebetween to receive the sealing device, a seat-forming ring on the inner part and rotatable therewith, a sealing washer surrounding the inner part and having a face in sealing contact with said ring, said sealing washer being provided with a cylindrical outer surface, a resilient O-ring surrounding said cylindrical surface and in sealing engagement therewith and in sealing engagement with the outer part, a metallic retainer having a sleeve portion surrounding the inner part and telescopically received within the sealing washer, and having a radial wall, thrust means including a freely floating member extending between the extreme outer periphery of said radial wall and the O-ring and designed for contact with the latter to retain the same on said cylindrical outer surface of said washer, said thrust means encircling at least a portion of the cylindrical outer surface of said washer, a spring encircling said inner part and also encircling the sleeve portion of said retainer and having one end bearing against the sealing washer and the other end bearing against the radial wall of the retainer, said spring normally urging the washer and retainer axially in opposite directions, and interengaging means on the sleeve portion of the retainer and on the sealing washer for preventing axial separation thereof.

2. In a sealing device for establishing a fluid tight seal between relatively rotatable inner and outer parts having an annular space therebetween to receive the sealing device, means providing a seat-forming ring on the inner part and rotatable therewith, a sealing washer surrounding the inner part and having a face in sealing contact with said ring, said sealing washer being provided with a cylindrical outer surface, a resilient O-ring surrounding said cylindrical surface and in sealing engagement therewith and in sealing engagement with the outer part, a circular thrust member encircling the cylindrical outer surface of the sealing washer adjacent the O-ring, a metallic cup-like retainer having a sleeve portion surrounding the inner part and telescopically received within the sealing washer and having a radial wall and an outer cylindrical wall spaced from said sleeve portion and designed for engagement with said thrust member, a spring surrounding said inner part and nested within said cup-like retainer and having one end bearing against the sealing washer and the other end bearing against the radial wall of the retainer, said spring normally urging the washer and retainer axially in opposite directions, and interengaging means on the sleeve portion of the retainer and on the sealing washer for preventing axial separation thereof.

3. A sealing device as claimed in claim 1 in which the free floating member is provided with an inturned flange designed for contact with said O-ring when the latter is shifted axially a predetermined degree and in which the interengaged means on the sleeve portion of the retainer and on the sealing washer comprises a series of inturned lugs on said sleeve portion designed for engagement with the sealing washer.

CHARLES F. VOYTECH.

References Cited in the file of this patent

UNITED STATES PATENTS

| Number | Name | Date |
|---|---|---|
| Re. 22,116 | Janette | June 16, 1942 |
| 2,037,144 | Olson | Apr. 14, 1936 |
| 2,250,311 | Meyer | July 22, 1941 |
| 2,321,871 | Stevenson | June 15, 1943 |
| 2,365,046 | Bottomley | Dec. 12, 1944 |
| 2,429,953 | Bottomley | Oct. 28, 1947 |